(12) United States Patent
Madurzak

(10) Patent No.: US 7,953,873 B1
(45) Date of Patent: May 31, 2011

(54) NETWORK-BASED SERVICE FOR MENU FILTERING BASED ON USER INFORMATION

(75) Inventor: David O. Madurzak, Poway, CA (US)

(73) Assignee: Intuit Inc., Mountain View, CA (US)

( * ) Notice: Subject to any disclaimer, the term of this patent is extended or adjusted under 35 U.S.C. 154(b) by 146 days.

(21) Appl. No.: 12/110,059

(22) Filed: Apr. 25, 2008

(51) Int. Cl.
  *G06F 15/16* (2006.01)
(52) U.S. Cl. .............................. 709/229; 705/15; 705/26
(58) Field of Classification Search ........................ None
  See application file for complete search history.

(56) References Cited

U.S. PATENT DOCUMENTS

| | | | | |
|---|---|---|---|---|
| 5,899,502 | A * | 5/1999 | Del Giorno | 283/67 |
| 2001/0025279 | A1 * | 9/2001 | Krulak et al. | 707/3 |
| 2003/0208409 | A1 * | 11/2003 | Mault | 705/26 |
| 2005/0075934 | A1 * | 4/2005 | Knight et al. | 705/15 |
| 2006/0020483 | A1 * | 1/2006 | Hsu | 705/1 |
| 2006/0041663 | A1 * | 2/2006 | Brown et al. | 709/226 |
| 2008/0113614 | A1 | 5/2008 | Rosenblatt | |
| 2009/0171736 | A1 * | 7/2009 | Segler et al. | 705/8 |

OTHER PUBLICATIONS

"Chili's Restaurant Allergen Menus", accessed at http://disabled-travelers-safety-health.suite101.com/article.cfm/chilis_restaurant_allergen_menus, dated Feb. 2, 2007.
Bouchez, Colette, "Food Allergies: Tips for Eating Out" accessed at http://www.24hourforums.com/forum151/15609.html, dated Oct. 16, 2007.
"Food allergies: Strategies for dining out" accessed at http://health.msn.com/health-topics/allergies/articlepage.aspx?cp-documentid=100096386, lasted Feb. 9, 2006.
"Food allergies: Strategies for dining out: Chef Card" accessed at http://stb.msn.com/i/9B/1349488E4239AE81D9273683F2B3D.pdf, last updated Feb. 9, 2006.
"Secret Garden: Food Allergy—My Biggest Enemy", accessed at http://secretgardenofpepperpourri.blogspot.com/2007/10/food-allergy-my-biggest-enemy.html, dated Oct. 16, 2007.
"Food allergies nothing to sneeze at, chains say: nearly 10 million Americans suffer allergies to seafood and nuts" accessed at http://findarticles.com/p/articles/mi_m3190/is_38_38/ai_n6207235, dated Sep. 20, 2004.

* cited by examiner

*Primary Examiner* — Ario Etienne
*Assistant Examiner* — Clayton R Williams
(74) *Attorney, Agent, or Firm* — Park, Vaughan, Fleming & Dowler LLP

(57) ABSTRACT

In various embodiments, a menu item identification service may provide a system user with information on acceptable restaurant menu items based on ingredients the system user prefers or is trying to avoid. The menu item identification service may receive information on ingredients the system user prefers or wants to avoid and information on a restaurant of interest to the system user. The menu item identification service may use a database to identify menu items of the restaurant and their associated ingredients. The menu item identification service may present the system user with menu items the restaurant offers that have preferred ingredients and/or do not have ingredients to avoid or that have limited quantities of the ingredient. Menu items with the ingredients to avoid may be shown along with avoidance indicators. The system user may then use this information to select a menu item and/or restaurant.

23 Claims, 10 Drawing Sheets

Restaurant B -
    Lasagna
    Chicken
    Parmesan
    Ravioli
    Chicken Marsala Spaghetti and Meatballs
Breadsticks
Tomato Soup ← 403

Restaurant C -
    Pork Ribs
    Ribeye Steak
    Pot Roast
    Hamburger
    Garden Salad Chicken Fried Steak
Eggrolls
Wheat Rolls
Cheesecake ← 405

Chicken Parmesan -
    Basil leaves
    Bay leaves
    Bread
    Gluten
    Cheese
    Chicken
    Eggs
    Flour
    Garlic
    Olive oil
    Olives
    Onion
    Pasta
    Pepper
    Salt
    Tomatoes High Fat (45 g)
High Calories (850 Calories)
High Cholesterol (140 mg)

| Avoid ingred. | Dislike ingred. | Preferred | Restaurant C Menu Items: |
|---|---|---|---|
| | | ☺ | Garden Salad |
| | | | Pork Ribs |
| | | | Ribeye Steak |
| | ♦ | | Eggrolls |
| X | | ☺ | Wheat Rolls |
| X | | ☺ | Cheesecake |
| X | | | Pot Roast |
| X | | | Hamburger |
| X | | | Chicken Fried Steak |

507

| Restaurant B Menu Items without "Dairy"- | Restaurant C Menu Items without "Dairy"- |
|---|---|
| Tomato Soup | Pork Ribs |
| | Ribeye Steak |

NETWORK-BASED SERVICE FOR MENU FILTERING BASED ON USER INFORMATION

BACKGROUND

People with food allergies, health conditions requiring a restricted diet, and/or who have food preferences may find it difficult to eat at restaurants because of the uncertainty of the ingredients in the menu items offered at the restaurant. Adding to the uncertainty, many ingredients have different names and/or can be found as sub-ingredients in various main ingredients. Some restaurants may post menus and ingredients online. In addition, individuals may bring in cards with the names of ingredients/sub-ingredients they are trying to avoid in order to inquire of the wait staff or cook whether a particular menu item has one or more of the ingredients. However, it may be difficult to locate acceptable menu items for any given restaurant of interest and/or compare acceptable menu items from different restaurants. Furthermore, it may be difficult inside the restaurant to find wait staff who know the ingredients of particular menu items.

SUMMARY

In various embodiments, a network-based menu item identification service may provide a system user with information on acceptable restaurant menu items based on ingredients the system user prefers or is trying to avoid. In some embodiments, the system user may provide the network-based menu item identification service with user information related to ingredients the system user prefers or is trying to avoid. Other sources for the user information may include the network-based menu item identification service determining one or more ingredients the system user should avoid based on access to the system user's healthcare information. In addition, the system user may provide the network-based menu item identification service with information on a restaurant of interest to the system user (e.g., the name of the restaurant, the type of restaurant, a location of the restaurant, etc). The network-based menu item identification service may use a restaurant/menu item database to identify menu items available at the restaurant identified by the system user and a menu item/ingredient database to identify ingredients associated with the various identified menu items (in some embodiments, the restaurants, menu items, and ingredients may be located on a single database).

In some embodiments, the network-based menu item identification service may use the identified ingredients associated with the various identified menu items to filter the menu items and provide the system user with information on which menu items the restaurant offers that are acceptable based on the received user information. In some embodiments, different categories of menu items may be provided to the system user according to different system user preferences. For example, the network-based menu item identification service may present the system user with menu items that do not have the one or more corresponding ingredient(s) at all (e.g., no peanuts if the system user indicates allergies to peanuts), that have limited quantities of the ingredient (e.g., limited salt if the system user is on a low-salt diet), that have preferred ingredients, or that normally use the identified ingredient, but for which a substitution is available. Other categories may also be used (e.g., user information may specify which ingredients a system user dislikes (but, for example, may not be allergic to)). The system user may then use the information on the acceptable menu items to select a menu item and/or restaurant. In some embodiments, the network-based menu item identification service may provide the system user with an ingredient list for the selected menu item that the system user may review to verify an ingredient was not overlooked and/or may provide to the wait staff, manager, cook, etc. to verify that the ingredient list is current. In some embodiments, the ingredient list may include a risk factor for one or more ingredients indicating the risk of an allergic reaction associated with the ingredient.

In some embodiments, the system user may access the network-based menu item identification service through a web browser and/or mobile device. For example, the system user may access the network-based menu item identification service through a web browser on a desktop or laptop computing platform, or may access the network-based menu item identification service through a mobile device having network access. In some embodiments, the location of the system user (e.g., as indicated by global positioning system (GPS) coordinates or other location-based system, from the system user's mobile device) may be used by the network-based menu item identification service to determine the restaurant the system user is located in and/or restaurants near the system user (to use as the restaurants of interest). The network-based menu item identification service may then determine acceptable menu items offered by different restaurants for the system user to use in making a menu item selection.

BRIEF DESCRIPTION OF THE DRAWINGS

FIGS. 4a-b illustrate sections of a restaurant/menu item database and a menu item/ingredient database, according to various embodiments.

FIGS. 5a-c illustrate displays providing menu items for the system user to choose from based on the user information, according to various embodiments.

Figure 1A:
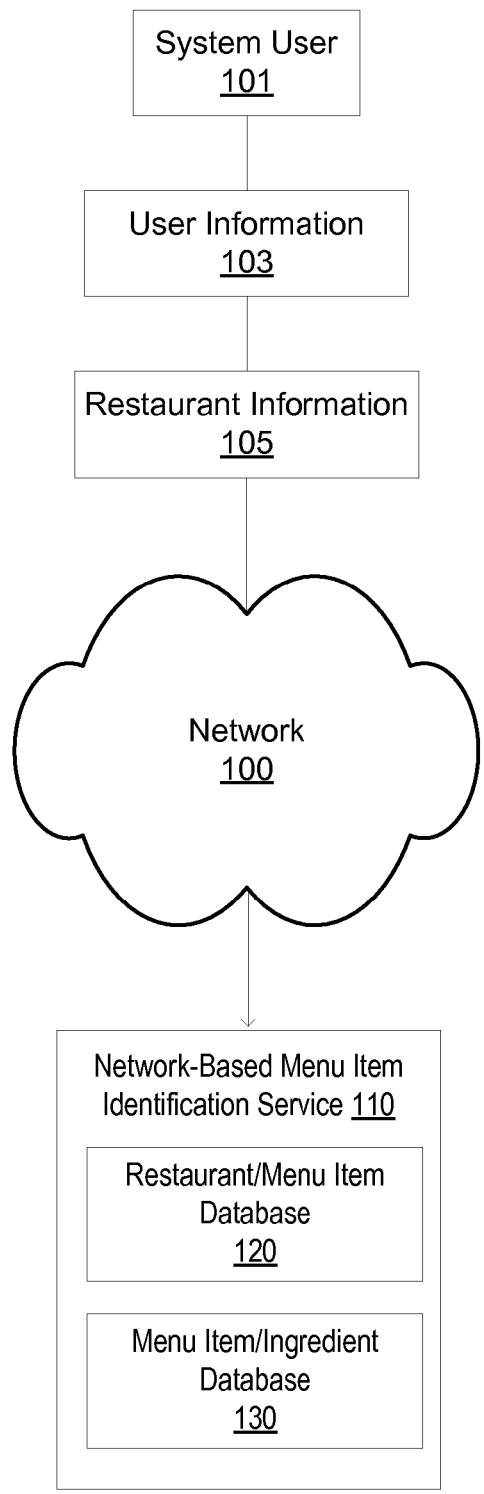
FIG. 1a illustrates an embodiment of a network-based menu item identification service for providing a system user with information on menu items the system user may select at a given restaurant.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF EMBODIMENTS

Figure 1B:
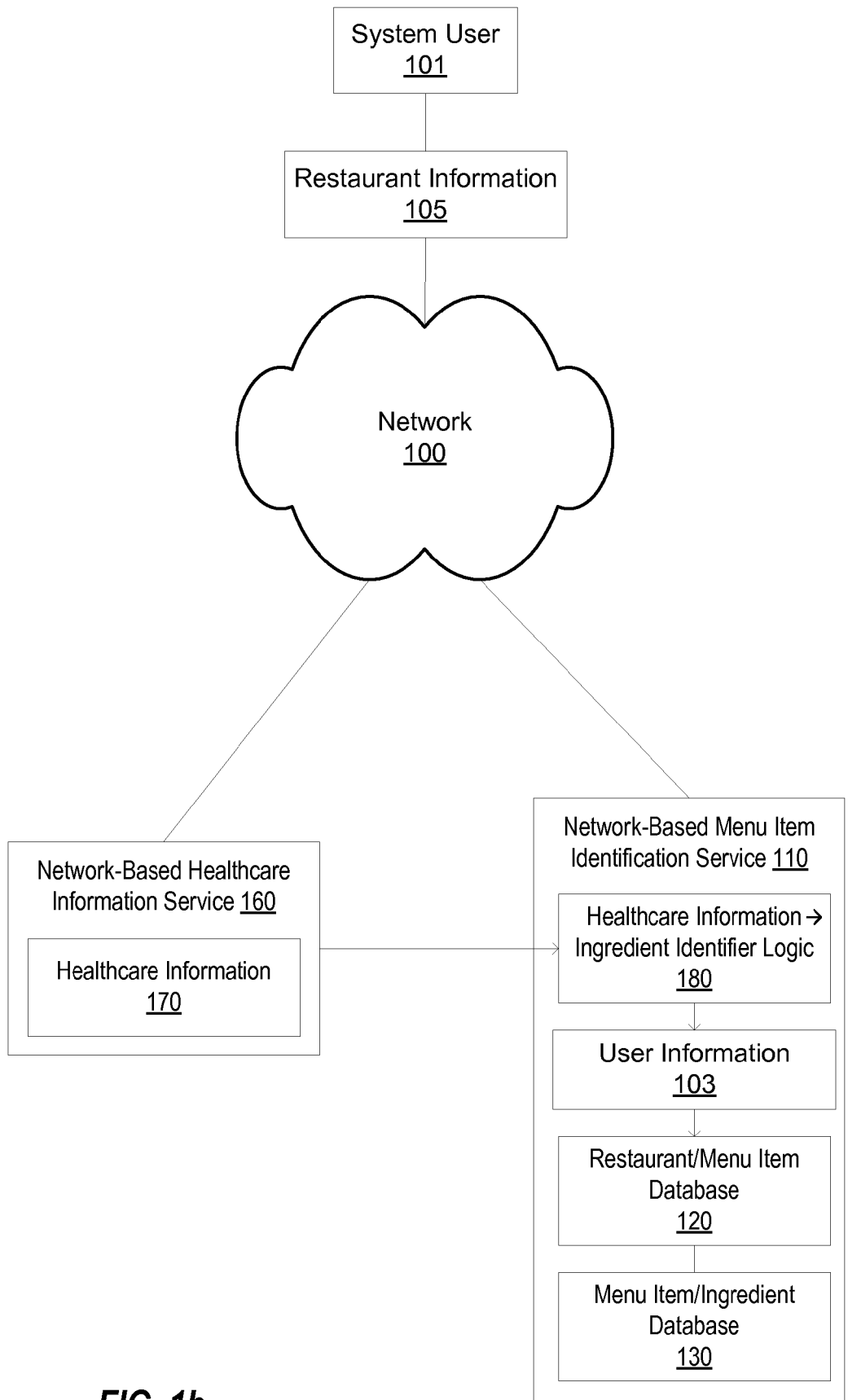
FIG. 1b illustrates an embodiment of the network-based menu item identification service using healthcare information to determine ingredient information for menu item selection.

FIG. 1a illustrates an embodiment of a network-based menu item identification service 110 for providing a system user 101 with information on acceptable restaurant menu items based on ingredients the system user 101 prefers or is trying to avoid. In some embodiments, the network-based menu item identification service 110 may receive user information 103 relating to ingredients the system user 101 prefers or is trying to avoid. For example, the system user 101 may provide user information 103 identifying one or more ingredients that are preferred or that should be avoided to the network-based menu item identification service 110 (e.g., through the graphical user interface 201 shown in FIG. 2). The user information 103 may include a food preference, a food allergy (e.g., a "gluten" allergy, a "peanut" allergy, etc), specific preferred ingredients, specific ingredients to avoid, etc. As seen in FIG. 1b, in some embodiments, ingredients may be determined by the network-based menu item identification service 110 (e.g., based on a food allergy, health condition, or personal food preference specified by the system user 101 or, for example, from healthcare information 170 for the system user 101). In some embodiments, the system user 101 may need to avoid certain ingredients (e.g., eggs, mayonnaises, ova derivatives, non-soy lethicin, etc.), because of a food allergy or health condition. Food allergies may include allergies to eggs, nuts, dairy products, seafood, gluten, soy, etc. Health conditions such as high blood pressure, heart disease, diabetes, obesity, etc. may also require dietary restrictions. As another example, the system user 101 may want to avoid certain ingredients because of a personal preference (e.g., the system user 101 may prefer not to eat meat). In some embodiments, the system user 101 may prefer certain foods (e.g., the system user 101 may prefer menu items with cheese or that are high in protein).

In some embodiments, the network-based menu item identification service 110 may receive restaurant information 105 on a restaurant of interest to the system user 101. For example, the system user 101 may provide the network-based menu item identification service 110 with the name and/or address of a restaurant. In some embodiments, the system user 101 may identify several restaurants of interest for the network-based menu item identification service 110 to analyze. In some embodiments, the network-based menu item identification service 110 may determine one or more restaurants of interest by correlating GPS or other types of positioning coordinates (e.g., using cell tower triangulation to locate a cell phone or an Internet Protocol (IP) address of a user's laptop if the user is using a Wi-Fi (Wireless Fidelity (IEEE 802.11b wireless networking)) hotspot) with restaurant information to determine a restaurant the system user 101 is located in or which restaurants are near the system user 101. These positioning coordinates could be GPS related or from any other type of positioning system available to the user. In some embodiments, the GPS coordinates or other positioning coordinates may be received from a system user's mobile device (e.g., mobile phone, laptop, etc). In some embodiments, the mobile device may be located permanently or removably in a vehicle. The network-based menu item identification service 110 may determine, for example, which menu items at the restaurant of interest do not have the ingredients the system user 101 is trying to avoid, have less than a specified amount of the ingredients, have ingredients the system user prefers, and/or menu items normally having one or more of the ingredients to avoid but which can be substituted with other, more acceptable ingredients (e.g., substituting low fat dressing for regular dressing).

In some embodiments, the network-based menu item identification service 110 may use a restaurant/menu item database 120 to identify menu items available at the restaurant of interest and a menu item/ingredient database 130 to identify ingredients associated with the various identified menu items. The network-based menu item identification service 110 may determine which menu items do not have an ingredient, have a quantity of the ingredient less than a specified amount, have preferred ingredients, etc.

In some embodiments, the network-based menu item identification service 110 may provide the system user 101 with information on which menu items one or more restaurants of interest offer that are acceptable based on the user information 103. In some embodiments, different categories of menu items may be provided to the system user 101 according to different system user preferences. For example, the network-based menu item identification service may present the system user 101 with menu items that do not have the one or more corresponding ingredient(s) at all (e.g., no peanuts if the system user indicates allergies to peanuts), that have limited quantities of the ingredient (e.g., limited salt if the system user is on a low-salt diet), that have preferred ingredients (e.g., are high in protein), or that normally use the identified ingredient, but for which a substitution is available. Other categories may also be used (e.g., user information 103 may specify which ingredients a system user 101 dislikes (but, for example, may not be allergic to)). Information about the ingredients in the menu item (e.g., menu item has >30 grams of fat) may also be provided to the system user 101. In some embodiments, a list of menu items may be provided and identifiers may be displayed relative to the menu items that indicate if the menu item has preferred ingredients, ingredients to avoid, etc. In some embodiments, the identified menu items and/or related information may be displayed to the system user 101 on the system user's mobile device or personal computer system, verbally over the phone (using a text to speech converter, or otherwise), etc. The system user 101 may use the provided information to select a menu item and/or restaurant.

In some embodiments, the system user 101 may provide the user information 103 directly (e.g., the system user 101 may use the graphical user interface 201 to specify "peanuts", "meat", or "high salt content", etc. as ingredients to avoid or, for example, may list "cheese" as ingredients the system user 101 prefers) or the system user 101 may provide the network-based menu item identification service 110 with information (e.g., food allergies, health conditions, personal preferences, etc.) and the network-based menu item identification service 110 may determine appropriate ingredients that are preferred or that should be avoided. For example, the user information 103 may indicate that the system user 101 is allergic to peanuts and the network-based menu item identification service 110 may identify (e.g., using look-up tables, database, logic (e.g., a rules file), etc.) ingredients that include peanuts (e.g., ingredients with peanuts, peanut oil, etc). As another example, the user information 103 may indicate that the system user 101 is a vegan and the network-based menu item identification service 110 may determine (e.g., using look-up tables, database, logic (e.g., a rules file), etc.) appropriate preferred ingredients (e.g., protein fortified beans, etc.) and/or ingredients to avoid (e.g., "meat", "eggs", "milk", etc). As another example, the user information 103 may indicate that the system user 101 has heart disease and high blood pressure.

The network-based menu item identification service 110 may then determine (e.g., using look-up tables, database, logic (e.g., a rules file), etc.) that appropriate ingredients to avoid include "high cholesterol", "high salt content", etc. and preferred ingredients may include "fish". As yet another example, the user information 103 may indicate that the system user 101 is on a diet and the network-based menu item identification service 110 may determine (e.g., using look-up tables, rules file, etc.) that appropriate ingredients to avoid include "high fat", "high carbohydrate", etc. In some embodiments, the network-based menu item identification service 110 may identify (e.g., using look-up tables, database, logic (e.g., a rules file), etc.) menu items that normally use the identified ingredient, but for which a substitution is available (e.g., low fat ranch dressing instead of a normally used regular dressing).

In some embodiments, the user information 103 may include ingredients the system user 101 is seeking. For example, the system user 101 may request menu items with "organic" ingredients. In some embodiments, the user information 103 may include an ingredient identifier. In some embodiments, the ingredient identifier may be determined by the network-based menu item identification service 110 and/or provided by the system user 101. For example, the ingredient identifier may include "peanuts", "meat", or "high salt content". Other ingredient identifiers may be represented by abbreviations, numbers, etc.

Figure 2:
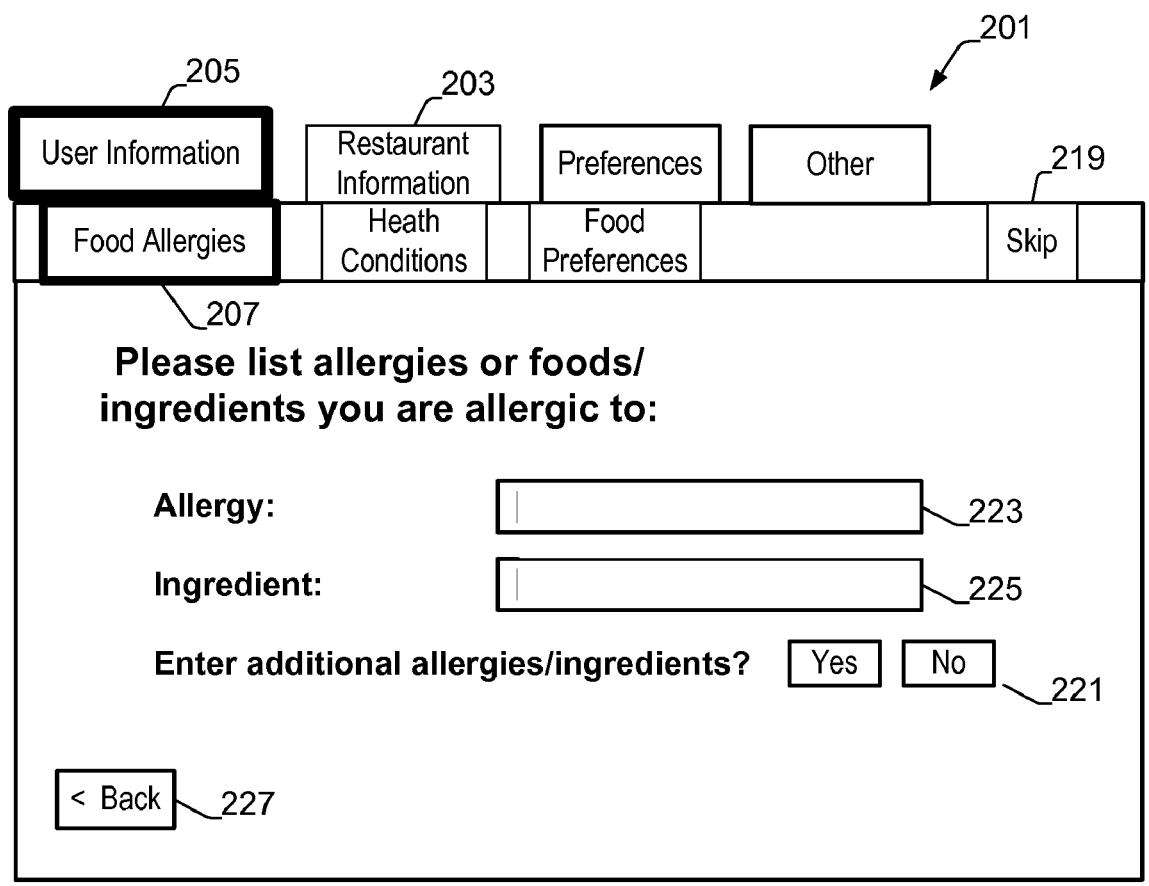
FIG. 2 illustrates an embodiment of a graphical user interface for data entry by a system user.

In some embodiments, the system user 101 may also provide restaurant information 105 (e.g., a name and/or address of a restaurant of interest) into, for example, the graphical user interface 201 (e.g., see FIG. 2). In some embodiments, the system user 101 may provide an address, zip code, etc. and the network-based menu item identification service 110 may identify restaurants within a given radius of the address, zip code, etc. to analyze. In some embodiments, the system user 101 may use a mobile device with a GPS positioning system and the network-based menu item identification service 110 may access or be provided the current or anticipated future position (such as the end of a planned route) of the system user 101. The network-based menu item identification service 110 may correlate the position and a map to identify which restaurant the system user 101 is inside or near to be used as the restaurant of interest (in some embodiments, several restaurants of interest may be identified (e.g., within a radius of the system user 101)). In some embodiments, the restaurant information 105 may be represented by a restaurant identifier. Restaurant identifiers may be provided directly by the system user 101 or may be determined by the network-based menu item identification service 110 based on information provided by the system user 101. Restaurant identifiers may include names of the restaurants, abbreviations, numbers, etc.

In various embodiments, the network-based menu item identification service 110 may access a restaurant/menu item database 120 to determine available menu items for a restaurant indicated by the restaurant identifier. In some embodiments, the system user 101 may indicate menu items the system user 101 is interested in at the restaurant and the network-based menu item identification service 110 may limit the analysis to the specified menu items. In some embodiments, menu items from several restaurants may be analyzed (e.g., menu items for restaurants within a given radius of the system user's location or a location specified by the system user 101). In some embodiments, the system user 101 may provide the radius (e.g., 5 miles) and/or the system user's location (or the restaurant location). In some embodiments, a default radius may be specified within the system.

In some embodiments, the restaurant/menu item database 120 may be built and/or updated by the network-based menu item identification service 110. For example, the network-based menu item identification service 110 may search restaurant web sites for menu information, receive menu information from the restaurants directly (e.g., by electronic mail, phone, etc.), receive menu information from staff visiting the restaurant and copying the menu, receive menu information from the community (e.g., from individuals who have visited the restaurant), etc. Information from the community may include information from people (e.g., with similar allergies) who have eaten at the restaurant and eaten a menu item without an adverse reaction (e.g., which may be evidence the menu item did not have the ingredient linked to the food allergy). In some embodiments, community members may also enter other information (e.g., a rating on how accommodating the given restaurant is toward people with food allergies, etc). In some embodiments, the restaurant/menu item database 120 may be maintained internally by the network-based menu item identification service 110 or may be accessed from an external source (e.g., the restaurant/menu item database 120 may be provided by a third party source).

In some embodiments, the network-based menu item identification service 110 may also access a menu item/ingredient database 130. The menu item/ingredient database 130 may provide the network-based menu item identification service 110 with ingredients for various menu items offered by a restaurant corresponding to the restaurant identifier. In some embodiments, the menu item/ingredient database 130 may provide the quantities of ingredients in the menu items (e.g., a quantity of salt, fat, cholesterol, etc). In some embodiments, menu item/ingredient database 130 may provide an inverse listing of ingredients (e.g., by listing ingredients not found in the menu items offered by the restaurant). For example, the menu item/ingredient database 130 may list "peanuts" as an ingredient not found in a given menu item. The network-based menu item identification service 110 may use the ingredients identified in the menu item/ingredient database 130 to determine which menu items are acceptable based on the user information 103.

In some embodiments, the network-based menu item identification service 110 and/or the menu item/ingredient database 130 may identify alternative ingredients associated with ingredients identified as preferred or to avoid and/or listed for various menu items. For example, if the system user 101 provides user information 103 indicating a need to avoid "dairy", the network-based menu item identification service 110 and/or the menu item/ingredient database 130 may identify menu items with alternative ingredients that would also be considered "dairy" (e.g., "milk", "cream", "cheese", etc). In some embodiments, the network-based menu item identification service 110 may use "milk", "cream", "cheese", etc. as ingredient identifiers when the system user 101 indicates "dairy" as an ingredient to avoid (e.g., when looking up "dairy" in the menu item/ingredient database 130, the network-based menu item identification service 110 may also look up "milk", "cream", "cheese", etc). In some embodiments, the ingredient identifier "dairy" may be associated with ingredient identifiers "milk", "cream", "cheese", etc. by the menu item/ingredient database 130 (e.g., when an ingredient list received from a restaurant for a menu item includes "milk", "cream", or "cheese", etc. the menu item/ingredient database 130 may also indicate "dairy" in the ingredient list stored for the menu item (e.g., to assist in ingredient look-ups by the network-based menu item identification service 110)). In some embodiments, the network-based menu item identification service 110 and/or menu item/ingredient database 130 may also consider sub-ingredients of main ingredients. For example, information from a restaurant may list "bread" as an ingredient of a menu item. The network-based menu item identification service 110 and/or menu item/ingredient database 130 may associate other ingredient identifiers (e.g., components of bread such as "milk", "flour", "gluten", etc.) with "bread". Other chemical components and/or derivatives may also be considered as ingredient identifiers (e.g., monosodium glutamate (MSG)). As another example, if a menu item was fried in peanut oil, peanut oil may be listed as an ingredient identifier (even though peanut oil may not normally be listed as an ingredient of the menu item, peanut oil residue may remain on the menu item after preparation). In some embodiments, these ingredient identifiers may then be considered when the menu item is being stored in the menu item/ingredient database 130 and/or analyzed by the network-based menu item identification service 110.

In some embodiments, the menu item/ingredient database 130 may also include information on the quantity of an ingredient in a menu item. For example, the menu item/ingredient database 130 may include the amount of salt, fat, calories, etc. in a menu item. In some embodiments, the network-based menu item identification service 110 may analyze the user information 103 on the basis of quantity (e.g., ingredient identifiers may include "high salt content" or "high fat"). For example, if the user information indicates a need to avoid "high fat", the network-based menu item identification service 110 may determine which menu items have less than a specified limit of fat grams (e.g., 30 grams). The specified limit may be provided, for example, by the system user 101 (e.g., through graphical user interface 201) or determined by the network-based menu item identification service 110 (e.g., according to recommended ingredient limits for individuals with similar health conditions as the system user 101).

In some embodiments, the menu item/ingredient database 130 may be built and/or updated by the network-based menu item identification service 110. For example, the network-based menu item identification service 110 may search restaurant web sites for ingredient information, receive ingredient information from the restaurants directly (e.g., by electronic mail, phone, etc.), receive ingredient information from staff visiting the restaurant and asking for ingredient information, receive ingredient information from the community (e.g., from individuals who have visited the restaurant), etc. In some embodiments, the menu item/ingredient database 130 may be maintained internally by the network-based menu item identification service 110 or may be accessed from an external source (e.g., the menu item/ingredient database 130 may be provided by a third party source). In some embodiments, the restaurant/menu item database 120 and the menu item/ingredient database 130 may be included in a single database (e.g., which lists restaurants, their menu items, and the corresponding ingredients for the menu items). In some embodiments, the restaurant/menu item database 120 and the menu item/ingredient database 130 may be separate databases and/or include further databases (e.g., the restaurant/menu item database 120 may include a collection of databases corresponding to separate restaurants).

In some embodiments, restaurant identifiers and/or ingredient identifiers may be used to determine acceptable menu items. For example, the restaurant/menu item database 120 and/or menu item/ingredient database 130 may be organized according to standardized restaurant identifiers and/or ingredient identifiers. The appropriate restaurant identifiers and/or ingredient identifiers may be provided directly by the system user 101 or determined (e.g., according to look-up tables) by the network-based menu item identification service 110 based on information received from the system user 101 or other sources (e.g., the system user's healthcare information 170).

In some embodiments, the system user 101 may provide the network-based menu item identification service 110 with user information, restaurant information, personal information, etc. through a web-based interface, a mobile device interface, over a phone line, etc. For example, the system user 101 may access a web page of a web-based interface and enter information about the system user 101 (e.g., through a graphical user interface 201). The information may be entered each time the system user 101 makes a menu item query or the information may be saved in a profile for the system user 101 such that the system user 101 does not have to provide the network-based menu item identification service 110 with the information each time the system user 101 accesses the network-based menu item identification service 110.

As seen in FIG. 1b, the network-based menu item identification service 110 may use healthcare information—ingredient identifier logic 180 to analyze healthcare information 170 from a network-based healthcare information service 160 to determine preferred ingredients or ingredients the system user 101 should avoid. In some embodiments, the network-based healthcare information service 160 may collect healthcare information 170 (e.g., food allergies/reactions, health conditions requiring a special diet, etc.) from a system user's health history and/or other healthcare information sources. In some embodiments, the network-based healthcare information service 160 may be a component of a healthcare management application that collects and organizes healthcare information 170 for system users 101. The healthcare information 170 may include personal health records, claims, bills, financial data and other health or business related data. In some embodiments, the network-based healthcare information service 160 may access system user personal files or business files to collect and organize information as part of healthcare information 170. In some embodiments, network-based healthcare information service 160 may receive healthcare information 170 sent from one or more external processes (e.g., a separate application executing on the system user's local computer). In some embodiments, the network-based healthcare information service 160 may co-exist on the same system as the healthcare information 170. In some embodiments, network-based healthcare information service 160 and healthcare information 170 may be located on separate systems and the network-based healthcare information service 160 may access healthcare information 170 via network 100.

In some embodiments, the healthcare information 170 may be entered by system users 101, providers (e.g., physicians, hospitals, health clinics, etc.), health plan providers (e.g., insurance companies), and other sources. Healthcare information 170 may include healthcare-related information collected about health conditions experienced by system users 101. In some embodiments, information about system users 101 may be included in healthcare information 170 for several health conditions. For example, system users 101 may experience more than one health condition over time. In some embodiments, collecting the healthcare information 170 may include aggregating healthcare information 170 for several respective system users 101 (corresponding to their respective health conditions) into one database.

The network-based healthcare information service 160 may be a component of, or integrated with a healthcare management application. The healthcare management application may, in some embodiments, provide the system user 101 with a framework and tools for collecting, organizing and managing information related to the system user's health history. This includes managing and organizing information related to past, current and future health services, health insurance plan(s) (e.g., what services are covered, coverage limits, claim status, and explanations of benefits), and finances related to healthcare (e.g., health insurance premiums, deductibles, co-payments, benefit payments, reimbursements from Flexible Spending Accounts (FSAs), Health Reimbursement Accounts (HRAs), health savings accounts, maximum out-of-pocket expenses, and maximum lifetime benefits). The healthcare information 170 may also include information about diagnoses, treatments, procedures, medications administered, healthcare providers, health plans, procedure and diagnostic codes, procedure and medication costs, costs covered by various health plans, dates and/or times of procedures, the providers associated with the procedures (e.g., the name of the physician performing the procedure and/or the facility where the procedure was performed), the cost of the procedures, the system user's address, and the address of the facility where procedures were performed, etc. In some embodiments, the healthcare management application may be configured to provide a system user 101 with a comprehensive and detailed health history, or may allow the system user 101 to extract and/or analyze his or her information regarding a particular health condition or event or a particular healthcare related service (e.g., diagnostic exam or a course of treatment for a chronic condition).

In some embodiments, the network-based menu item identification service 110 and/or network-based healthcare information service 160 may be implemented as a web-based service to which system users 101 may subscribe. In some embodiments, the network-based menu item identification service 110 and/or network-based healthcare information service 160 may be implemented as a stand-alone application, such as one installed and executed on a desktop computer. In some embodiments, the network-based menu item identification service 110 and/or network-based healthcare information service 160 may include both a locally installed application (i.e., a client portion) and a remote, web-based application (i.e., a server portion). In some embodiments, network-based menu item identification service 110 and/or network-based healthcare information service 160 may be implemented as a web-based application accessed by one or more web pages.

In various embodiments, the network-based menu item identification service 110 may use the healthcare information—ingredient identifier logic 180 to analyze the healthcare information 170 to determine preferred ingredients or ingredients the system user 101 should avoid. For example, if healthcare information 170 indicates the system user 101 has been treated for food allergies related to peanuts (or received a diagnosis indicating an allergy to peanuts), the network-based menu item identification service 110 may identify "peanuts" as an ingredient the system user 101 should avoid. As another example, if the healthcare information 170 indicates the system user 101 has a history of heart disease, the network-based menu item identification service 110 may identify "high cholesterol" as an ingredient the system user 101 should avoid (an appropriate menu item may not have to be cholesterol free, but may need to have less than a specified limit of cholesterol). For example, the network-based menu item identification service 110 may determine (e.g., according to look-up tables, logic statements, etc.) that appropriate menu items for the system user 101 should have less than 100 milligrams (mg) of cholesterol. In some embodiments, the healthcare information—ingredient identifier logic 180 may use look-up tables (or logic statements, etc.) to link healthcare information (for example, healthcare related events, diagnosis, prescriptions, etc.) to appropriate ingredients and/or specified ingredient limits for the system user 101 to avoid. In some embodiments, the network-based menu item identification service 110 may present the determined ingredients to the system user 101 for approval. In some embodiments, the system user 101 may add or subtract from the ingredients determined by the network-based menu item identification service 110.

FIG. 2 illustrates an embodiment of a graphical user interface 201 for data entry by a system user 101. In some embodiments, the graphical user interface 201 may include main tabs (e.g., tabs 203 and 205) associated with sub-tabs (e.g., see sub-tab 207). The system user 101 may navigate through the graphical user interface 201 by clicking on a main tab or sub tab (e.g., through a mouse manipulated cursor). The system user 101 may also use a "Skip" tab 219 to move forward or a "Back" tab 227 to move backward through the entry options. In some embodiments, the graphical user interface 201 may include interface options for entering ingredient identifiers and restaurant identifiers. For example, input field 223 may receive an allergy of the system user 101 (e.g., allergy to peanuts, etc). As another example, input field 225 may receive an ingredient the system user 101 is allergic to and buttons 221 may be used to indicate additional inputs are needed. In some embodiments, the graphical user interface 201 may list food allergies and the system user 101 may check the appropriate allergies. In some embodiments, the graphical user interface 201 may list allergies and/or other ingredient identifiers to the system user 101 that were determined from the system user's healthcare information 170 and the system user 101 may confirm or change the displayed information. In some embodiments, the system user 101 may also set up various preferences. For example, the system user 101 may request to verify a food allergies list for the system user 101 each time the system user 101 makes an inquiry for menu items. As another example, the system user 101 may list food types that the system user 101 wants avoided for all restaurants (e.g., the system user 101 may indicate that they do not want appetizers considered). In some embodiment, the graphical user interface 201 may be displayed through a web browser, through a mobile device, etc.

Figure 3A:
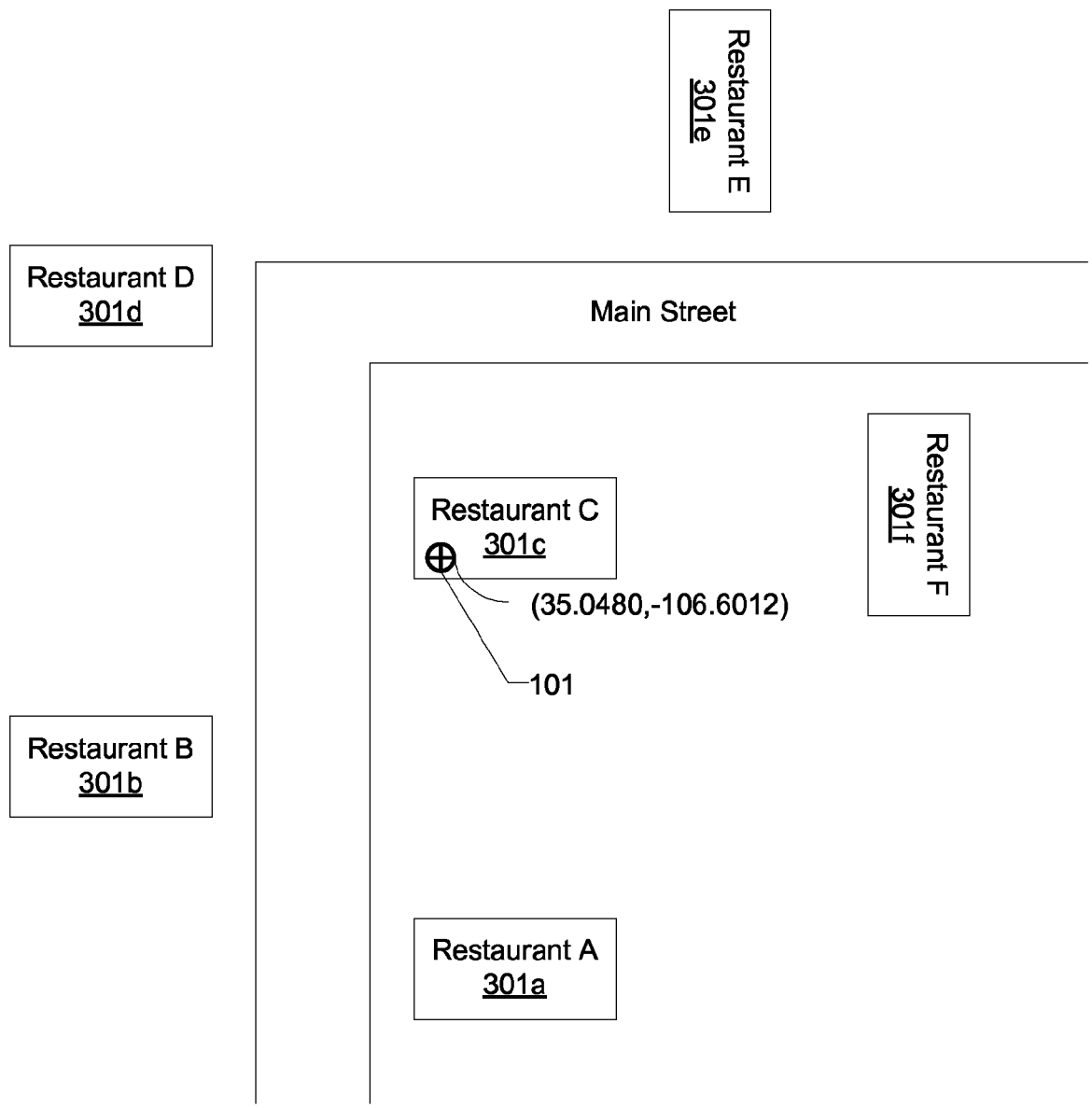
FIGS. 3a-b illustrate identifying restaurants for a system user, according to various embodiments.
Figure 3B:
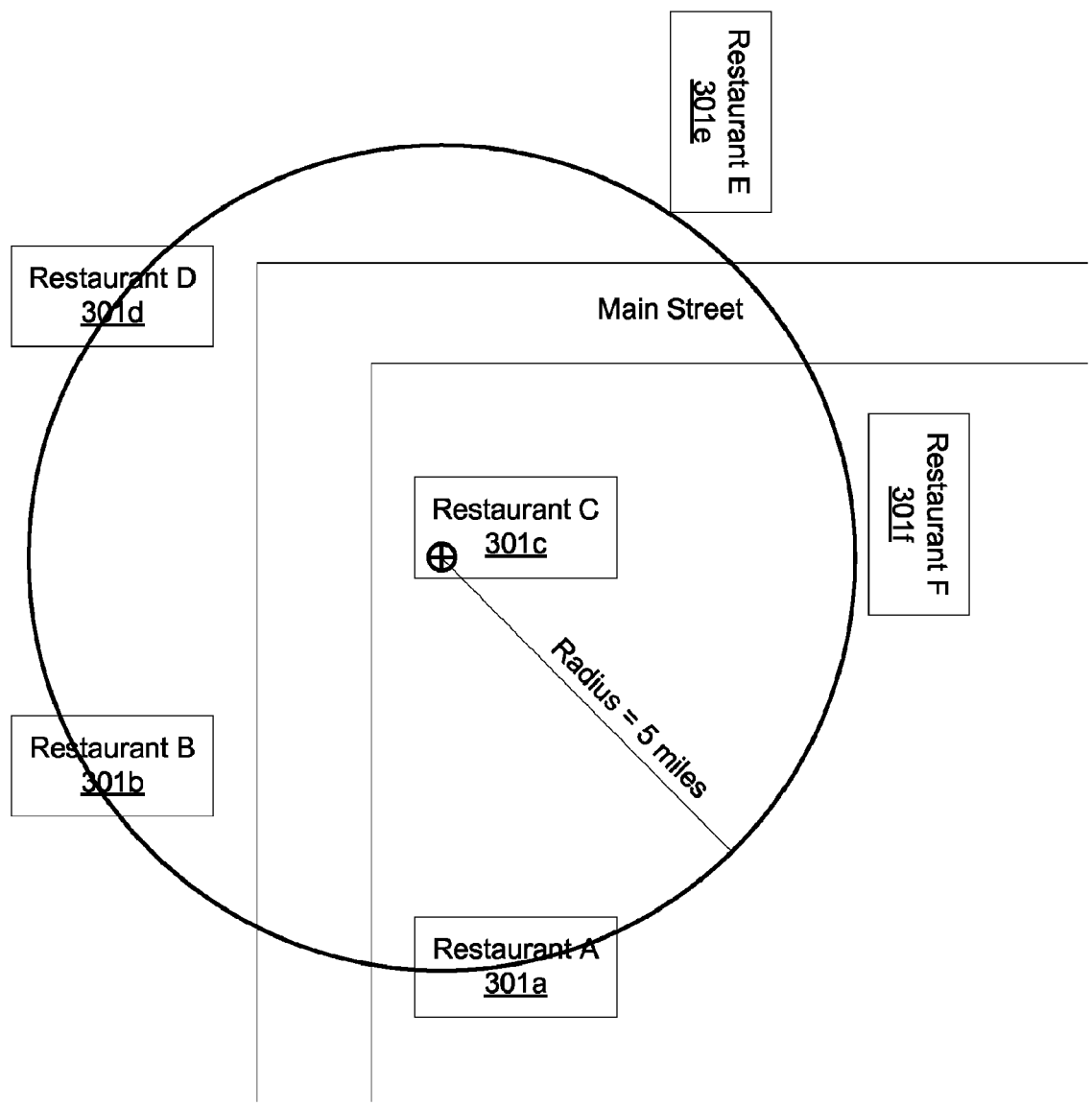

FIGS. 3*a*-*b* illustrate identifying restaurants for a system user 101, according to various embodiments. In some embodiments, the network-based menu item identification service 110 may identify a restaurant the system user 101 is located in by GPS coordinates received from the system user's mobile device (e.g., mobile phone). For example, as seen in FIG. 3*a*, the system user 101 may be located in Restaurant C 301*c* as determined by the system user's transmitted GPS coordinates (35.0480,−106.6012). Restaurant C 301*c*, in this embodiment, may be used as the restaurant of interest. In some embodiments, the system user 101 may enter the name of the restaurant and/or address of the system user 101 (e.g., through the graphical user interface on the user's mobile phone).

In some embodiments, multiple restaurants within a radius (e.g., 5 miles as shown in FIG. 3*b*) may be identified by the network-based menu item identification service 110 as the restaurants of interest. For example, restaurants "Restaurant A" 310*a*, "Restaurant B" 301*b*, "Restaurant C" 301*c*, and "Restaurant D" 301*d* may be considered restaurants of interest by the network-based menu item identification service 110 for the system user 101 (e.g., menu items from these restaurants may be analyzed for the indicated ingredient identifiers to determine which menu items are acceptable for the system user 101). In this embodiment, menu items from restaurants "Restaurant E" 301e and "Restaurant F" 301f may not be considered unless the system user 101 expands the search radius. In some embodiments, the radius may be provided by the system user 101 or network-based menu item identification service 110 (e.g., a default radius).

FIGS. 4a-b illustrate sections of a restaurant/menu item database 120 and a menu item/ingredient database 130, respectively, according to an embodiment. Section 401 illustrates an exemplary section of a restaurant/menu item database 120 including menu items 403 for Restaurant B and menu items 405 for Restaurant C. Restaurant/menu item database 120 may include multiple sections including restaurants and menu items available at various restaurants. Section 407 shows an exemplary listing of ingredients and/or quantities of ingredients for a menu item from the restaurant/menu item database 120. Menu item/ingredient database 130 may also include multiple sections of menu items and corresponding ingredients. The menu item/ingredient database 130 may also include information on the menu items (e.g., fat content, caloric content, cholesterol content, etc). In some embodiments, the restaurant/menu item database 120 and menu item/ingredient database 130 may be included in a single database. In some embodiments, the network-based menu item identification service 110 may determine which menu items to analyze by accessing the menu items listed in the restaurant/menu item database 120 (e.g., menu items listed under restaurants corresponding to the identified restaurant identifiers). The network-based menu item identification service 110 may then access the menu item/ingredient database 130 for each menu item for the corresponding restaurant to determine which menu items are appropriate in view of the user information 103.

Figures 5A, 5B:
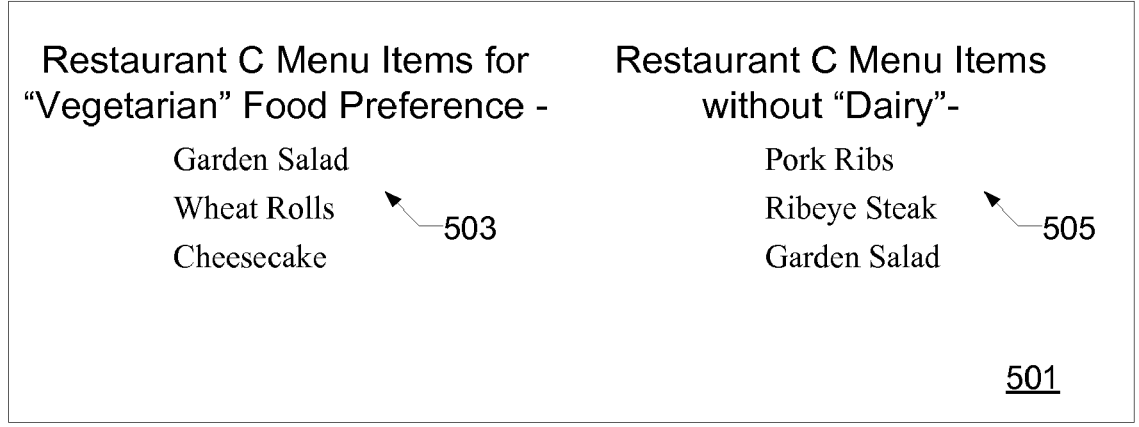

FIGS. 5a-c illustrate displays to provide menu items for the system user 101 to choose from based on the user information 103. For example, display 501 (see FIG. 5a) illustrates various menu items for the system user 101 appropriate for the received user information 103 (e.g., list 503 of menu items relevant to a specified food preference (e.g., "vegetarian")) and list 505 of menu items that do not have dairy (e.g., appropriate if the user information 103 for the system user 101 indicates "dairy" should be avoided). Display 507 illustrates a list of menu items offered at Restaurant C with indicators next to the list to indicate which menu items have ingredients that should be avoided and which menu items may be preferred because of a food preference of the system user 101. Other indicators may be used such as indicators for menu items that include ingredients that the system user 101 dislikes. As shown in the displayed example, pot roast, hamburger, chicken fried steak, wheat rolls, and cheesecake may include indicators to show that these menu items have ingredients that should be avoided (e.g., these menu items may include "dairy" related ingredients). Eggrolls may include an indicator showing that it includes an ingredient that the system user 101 does not like (e.g., system user 101 may not be allergic to MSG, but may prefer not to eat menu items (such as the eggrolls) with MSG). Garden salad, wheat rolls, and cheesecake may include indicators showing they include preferred ingredients (e.g., the system user 101 may have a vegetarian food preference). Other indicators may also be used (e.g., menu items may have highlighting, underlining, strikethrough, etc). Another indicator may include not listing a menu item (e.g., if the menu item includes ingredients to be avoided). Menu items may also be sorted according to the different indicators (e.g., all menu items with ingredients to be avoided may be placed on the bottom of the list and menu items with preferred ingredients may be placed on the top of the list).

In some embodiments, priorities may be assigned to different preference categories. For example, indicating foods with ingredients to avoid may receive top priority, followed by indicating food with preferred ingredients, and then indicating foods with ingredients the system user 101 dislikes. In some embodiments, the priorities may be used when generating and/or sorting a list of menu items to provide the system user 101. For example, menu items with ingredients to avoid may be sorted first (e.g., and placed on the bottom of the list), then menu items may be sorted according to preferred ingredients (and, due to the top priority of the avoid indicators, the preferred items with ingredients to avoid may be moved up the list but only to the top of the bottom portion of the list including the menu items with ingredients to avoid). Similarly, dislike menu items may be sorted in the respective portions of the list. Priorities may also be used in generating the lists (e.g., different lists may be generated and/or menu items with ingredients to avoid may not be displayed in respective lists (even though one or more of these menu items may include a preferred ingredient)). Menu item lists may also be provided across different restaurants. For example, display 509 (see FIG. 5c) shows two restaurants side by side including the available menu items that do not have dairy. The system user 101 may use display 501 when considering menu items at Restaurant C 301c (e.g., where the system user 101 may be located). Display 503 may be used by the system user 101 to decide which restaurant to visit (or whether to change restaurants). For example, the system user 101 may want to select a restaurant with the most menu items that are acceptable for him/her based on the user information 103.

Figure 6:
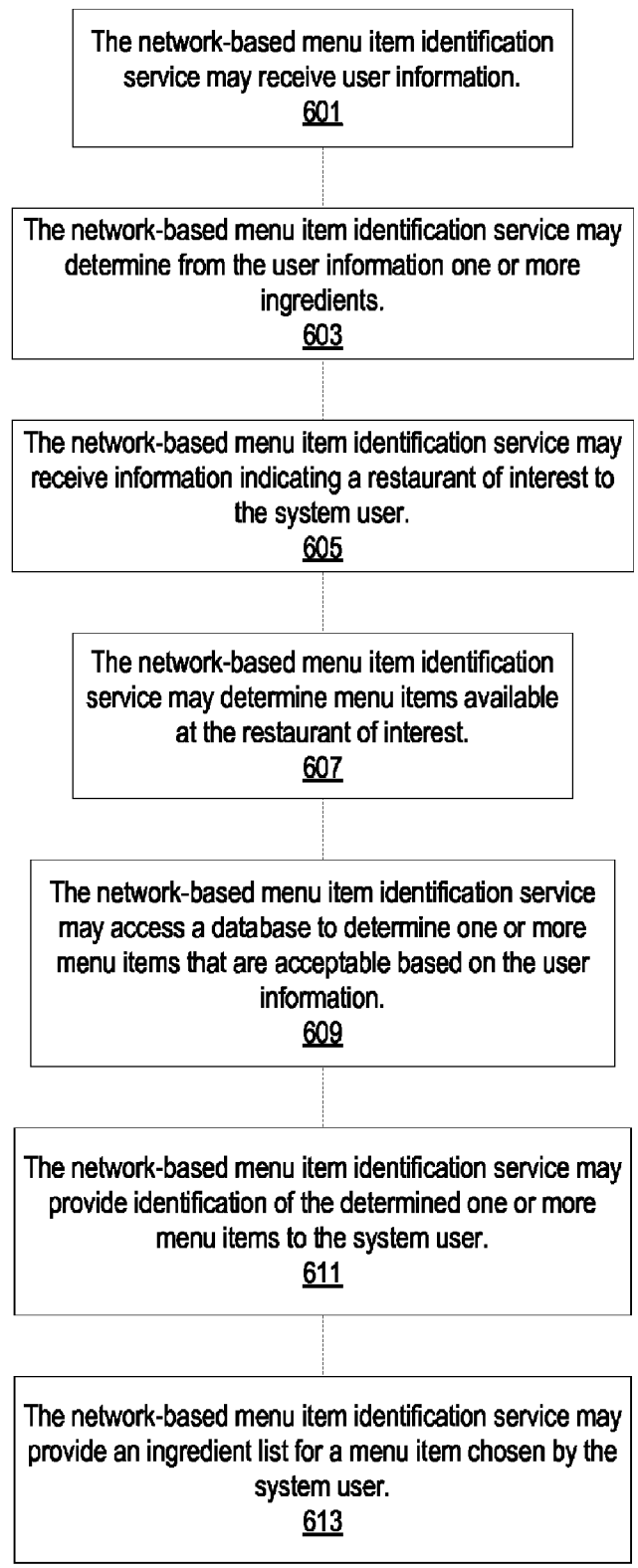
FIG. 6 illustrates a flowchart of a method for menu item selection based on user information, according to an embodiment.

FIG. 6 illustrates a flowchart of a method for menu item selection based on user information 103, according to an embodiment. It should be noted that in various embodiments of the methods described below, one or more of the elements described may be performed concurrently, in a different order than shown, or may be omitted entirely. Other additional elements may also be performed as desired.

At 601, the network-based menu item identification service 110 may receive user information 103. For example, the user information 103 may be received directly (e.g., through graphical user interface 201) from the system user 101 or may be determined from information received from another source (e.g., a network-based healthcare information service 160). In some embodiments, the system user 101 may access the graphical user interface 201 through a web site (and/or mobile device) providing/linked to the network-based menu item identification service 110 and may enter user information 103 identifying specific preferred ingredients or ingredients to avoid and/or information about the system user's allergies, food preferences, etc. In some embodiments, the system user 101 may enter user information 103 each time the system user 101 accesses the network-based menu item identification service 110 or the system user 101 may initially set up a profile that may be accessed, for example, by logging in with a password. In some embodiments, the system user 101 may access the network-based menu item identification service 110 and provide the user information 103 through a mobile device, for example, while the system user 101 is located in the restaurant.

At 603, the network-based menu item identification service 110 may determine from the user information 103 one or more ingredients (e.g., ingredients that are preferred or ingredients to be avoided). For example, the user information 103 may indicate that the system user 101 is allergic to peanuts and the network-based menu item identification service 110 may identify ingredients that include peanuts (e.g., ingredients with peanuts, peanut oil, etc). As another example, the user information 103 may indicate that the system user 101 prefers "organic" foods and the network-based menu item identification service 110 may determine appropriate preferred ingredients (e.g., certified organic produce) and/or ingredients to avoid (e.g., "meat", "eggs", etc). As another example, the user information 103 may indicate that the system user 101 has diabetes. The network-based menu item identification service 110 may then determine that appropriate ingredients to avoid include "sugar", "sucrose", etc. As yet another example, the user information 103 may indicate that the system user 101 is on a diet and the network-based menu item identification service 110 may determine that appropriate ingredients to avoid include "high fat", "high carbohydrate", etc. In some embodiments, the network-based menu item identification service 110 may identify menu items that normally use the identified ingredient, but for which a substitution is available. In some embodiments, the network-based menu item identification service 110 and/or menu item/ingredient database 130 may also consider sub-ingredients of main ingredients. For example, information from a restaurant may list "bread" as an ingredient of a menu item. The network-based menu item identification service 110 and/or menu item/ingredient database 130 may associate other ingredient identifiers (e.g., components of bread such as "milk", "flour", "gluten", etc.) with "bread". Other chemical components and/or derivatives may also be considered as ingredient identifiers (e.g., monosodium glutamate (MSG)). In some embodiments, the network-based menu item identification service 110 may determine preferred ingredients or ingredients for the system user 101 to avoid by accessing healthcare information 170 (e.g., from the network-based healthcare information service 160) for the system user 101. In some embodiments, the network-based menu item identification service 110 may determine one or more representative ingredient identifiers based on the received user information 103.

At 605, the network-based menu item identification service 110 may receive restaurant information 105 indicating a restaurant of interest to the system user 101. A restaurant of interest may be provided directly by the system user 101 (e.g., through graphical user interface 201) or may be determined by the network-based menu item identification service 110. In some embodiments, the system user 101 may provide the name and/or address (e.g., city and/or zip code) of a restaurant of interest (e.g., to a web site and/or mobile device). In some embodiments, the system user 101 may access the network-based menu item identification service 110 through the web site prior to going to the restaurant. In some embodiments, the network-based menu item identification service 110 may determine the restaurant of interest to the system user 101 according to GPS coordinates from the system user's mobile device. In some embodiments, the network-based menu item identification service 110 may provide identify one or more potential restaurants of interest, e.g., based on received GPS coordinates, to the system user 101 and the system user 101 may select the correct restaurant (e.g., the restaurant the system user 101 is located in). In some embodiments, the system user 101 may indicate an area (e.g., by entering a zip code) and the network-based menu item identification service 110 may analyze restaurants in that area (e.g., within a given radius of the area indicated by the system user 101). In some embodiments, the system user 101 may further filter down the restaurants by providing additional filtering criteria (e.g., the system user 101 may indicate an interest in Italian food or may provide a price range, etc). In some embodiments, the network-based menu item identification service 110 may determine one or more representative restaurant identifiers based on the received restaurant information 105.

At 607, the network-based menu item identification service 110 may determine menu items available at the indicated restaurant of interest. For example, the network-based menu item identification service 110 may access a restaurant/menu item database 120 to determine menu items available at the restaurant of interest. In some embodiments, the network-based menu item identification service 110 may perform a database look-up based on a determined restaurant identifier for menu items offered at the restaurant of interest. In some embodiments, the system user 101 may identify to the network-based menu item identification service 110 one or more menu items the system user 101 is interested in ordering and the network-based menu item identification service 110 may focus the analysis on these menu items.

At 609, the network-based menu item identification service 110 may access a database (e.g., a menu item/ingredient database 130) to determine one or more menu items (for the restaurant of interest identified at 605) that are acceptable based on the user information 103. In some embodiments, determining one or more menu items that are acceptable may include identifying menu items that do not have an ingredient (e.g., "peanuts", "dairy", etc.) to be avoided by the system user 101. In some embodiments, ingredients in the menu item/ingredient database 130 may be associated with an allergy risk. For example, a risk factor may be included with each ingredient that indicates a likelihood of experiencing an allergic reaction to the ingredient if consumed by a person with a particular food allergy (e.g., a risk factor of 100% likelihood of reaction may be assigned to peanut butter for a person with a peanut allergy and a risk factor of 10% likelihood of reaction may be assigned to bread for a person with a dairy allergy). In some embodiments, the ingredients may have multiple risk factors (e.g., associated with different respective food allergies). In some embodiments, a menu item may be determined not acceptable if one or more ingredients has a risk factor above a threshold (e.g., provided by the system user 101 or the network-based menu item identification service 110. In some embodiments, the risk factor may be provided with the menu item if selected to be presented to the system user 101 as a possible acceptable menu item. In some embodiments, determining one or more menu items that are acceptable may include identifying menu items that do not have, for example, high fat, high cholesterol, high salt, etc. (the acceptable menu items may have fat, cholesterol, or salt, but the amount may be below a specified limit). The specified limit may be set by the network-based menu item identification service 110 (e.g., upon the network-based menu item identification service 110 analyzing the system user's healthcare information 170), or the limit may be specified, for example, by the system user 101. For example, the network-based menu item identification service 110 may specify a higher specified limit of cholesterol for a system user 101 with a short, mild history of heart disease than for a system user 101 with a long, high-risk history of heart disease. In some embodiments, the network-based menu item identification service 110 may access one database with information on restaurants, menu items, and ingredients (e.g., 605 and 607 may be combined). In some embodiments, the network-based menu item identification service 110 may perform a look-up on the menu item/ingredient database 130 using one or more representative ingredient identifiers. In some embodiments, the network-based menu item identification service 110 may also look up alternative and/or sub-ingredients. In some embodiments, the system user 101 may access the restaurant/ menu item database 120 and/or menu item/ingredient database 130 directly or through the network-based menu item identification service 110.

At 611, the network-based menu item identification service 110 may provide identification of the determined acceptable one or more menu items to the system user 101. For example, the network-based menu item identification service 110 may display the acceptable menu items on a system user's computer display (e.g., through a web browser), mobile device display, etc. In some embodiments, the acceptable menu items may be displayed with one or more risk factors for various ingredients. In some embodiments, a cumulative risk factor may be calculated for multiple ingredients in the menu item. In some embodiments, the network-based menu item identification service 110 may provide the determined acceptable one or more menu items in a downloadable file (e.g., in Portable Document Format (PDF)) that the system user 101 may download, for example, to their mobile device for viewing at the restaurant. In some embodiments, the system user 101 may print the listing of determined acceptable one or more menu items and may bring the printout to the restaurant. In some embodiments, the menu items may be relayed audibly (e.g., through a phone line). In some embodiments, the network-based menu item identification service 110 may also display an indication of when the information (e.g., menu items/ingredients, etc.) was last updated. The network-based menu item identification service 110 may also provide an indication as to how reliable the information is (e.g., whether the information was received directly from the restaurant or from a third party).

At 613, the network-based menu item identification service 110 may provide an ingredient list for a menu item chosen by the system user 101. The ingredient list may be accessed from the menu item/ingredient database 130 for the menu item selected by the system user 101 (from the acceptable menu items determined for the system user 101). The system user 101 may review the ingredient list to verify that an ingredient was not overlooked by the network-based menu item identification service 110. In some embodiments, the ingredient list may include one or more risk factors (e.g., indicating risk of reaction) displayed with the ingredients. In some embodiments, the system user 101 may be encouraged to verify with a waiter/waitress and/or manager or cook that the selected menu item does not have the ingredient the system user 101 is trying to avoid. For example, the system user 101 may show the ingredient list to the waiter/waitress and/or manager or cook to verify that the ingredient list is current.

In some embodiments, the system user 101 may be an individual or an entity such as a restaurant. For example, the restaurant may use the network-based menu item identification service 110 to print sheets of acceptable menu items for specific food allergies, health conditions, etc. that the restaurant can provide to individuals with that particularly food allergy, health condition, etc. who visit the restaurant. For example, one sheet may include the acceptable menu items for someone with a food allergy to peanuts (in this embodiment, the restaurant identifier may correspond to the inquiring restaurant and the ingredient identifier may correspond to "peanut"). Being able to notify guests as to which menu items have certain ingredients and thus should be avoided may help reduce a restaurant's potential liability. The restaurant may also have other sheets for other food allergies/health conditions (or, for example, a vegan food preference). In some embodiments, the network-based menu item identification service 110 may provide the service to the restaurant in exchange for information about the restaurant's menus and/or ingredients (e.g., to use with other system users 101 who inquire about that restaurant).

Figure 7:
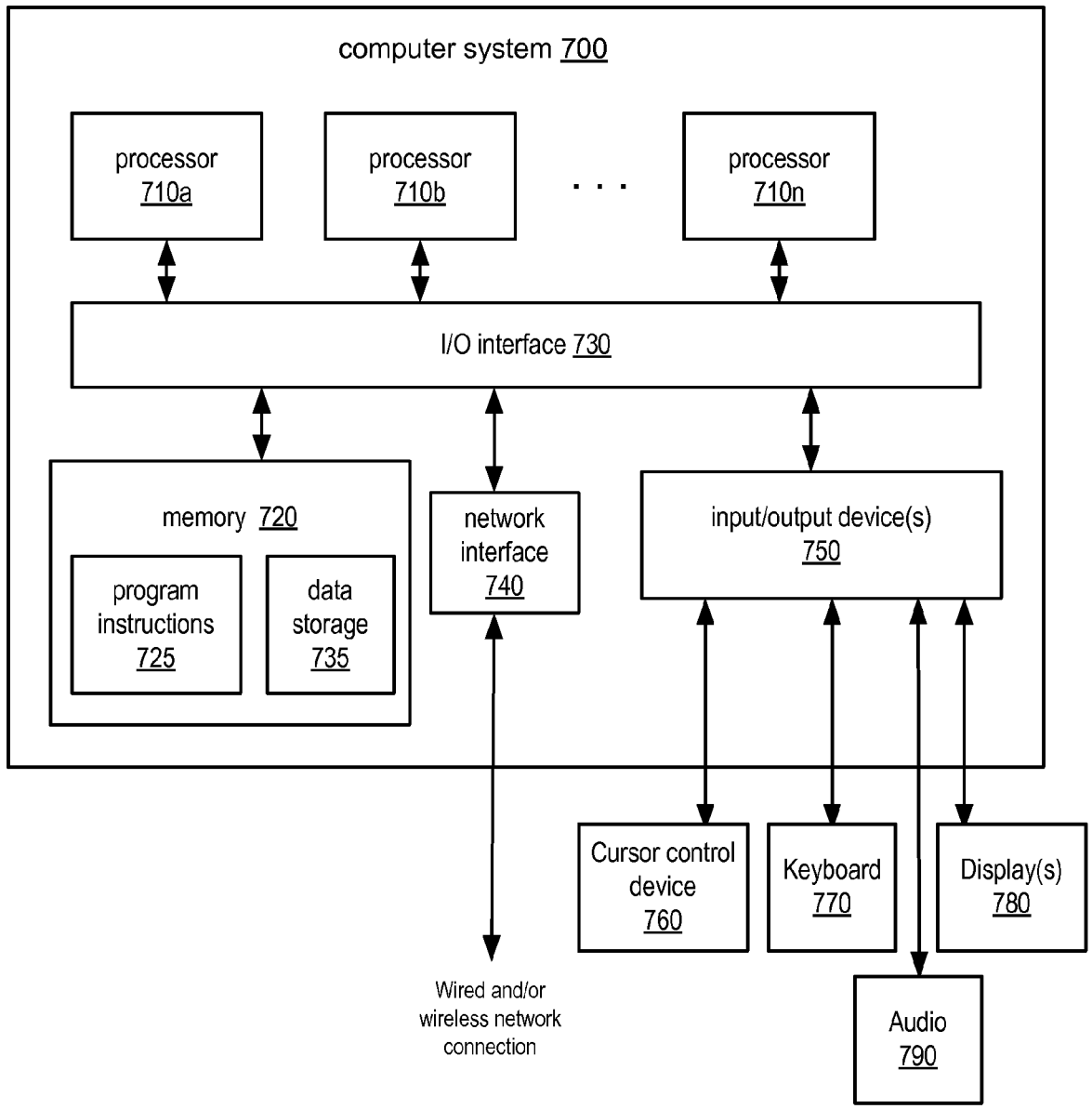
FIG. 7 illustrates an embodiment of a system for implementing the network-based menu item identification service and network-based healthcare information service.

Various components of embodiments of the network-based menu item identification service 110 and network-based healthcare information service 160 as described herein may be executed on one or more computer systems, which may interact with various other devices. One such computer system is illustrated by FIG. 7. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, Scalable Processor Architecture (SPARC), or MIPS ISAs, or any other suitable ISA. In multiprocessor systems, each of processors 710 may commonly, but not necessarily, implement the same ISA.

System memory 720 may be configured to store program instructions and/or information accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and information implementing desired functions, such as those described above for the network-based menu item identification service 110 and network-based healthcare information service 160, are shown stored within system memory 720 as program instructions 725 and information storage 735, respectively. In other embodiments, program instructions and/or information may be received, sent or stored upon different types of computer-accessible media or on similar media separate from system memory 720 or computer system 700. Generally speaking, a computer-accessible medium may include storage media or memory media such as magnetic or optical media, e.g., disk or Compact Disc/Digital Versatile Disc-Read Only Memory (CD/DVD-ROM) coupled to computer system 700 via I/O interface 730. Program instructions and information stored via a computer-accessible medium may be transmitted by transmission media or signals such as electrical, electromagnetic, or digital signals, which may be sent via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other information transformations to convert information signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow information to be exchanged between computer system 700 and other devices attached to a network, such as other computer systems, or between nodes of computer system 700. In various embodiments, network interface 740 may support communication via wired or wireless general information networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving information by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement at least a portion of embodiments of the network-based menu item identification service 110 and network-based healthcare information service 160 as described herein, and data storage 735, comprising various documents, tables, databases, etc. accessible by program instructions 725. In one embodiment, program instructions 725 may include software elements of the network-based menu item identification service 110 and network-based healthcare information service 160 illustrated in the Figures, and information storage 735 may include information used in embodiments of the network-based menu item identification service 110 and network-based healthcare information service 160. In other embodiments, different software elements and information may be included.

Those skilled in the art will appreciate that computer system 700 is merely illustrative and is not intended to limit the scope of the network-based menu item identification service 110 and network-based healthcare information service 160 as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and information integrity. Alternatively, in other embodiments some or all of the software components may execute in memory on another device and communicate with the illustrated computer system via inter-computer communication. Some or all of the system components or information structures may also be stored (e.g., as instructions or structured information) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, sent via a communication medium such as a network and/or a wireless link. Various embodiments may further include receiving, sending or storing instructions and/or information implemented in accordance with the foregoing description upon a computer-accessible medium. Accordingly, the present invention may be practiced with other computer system configurations.

Various embodiments may further include receiving, sending or storing instructions and/or information implemented in accordance with the foregoing description upon a computer-accessible medium. Generally speaking, a computer-accessible medium may include storage media or memory media such as magnetic or optical media, e.g., disk or DVD/CD-ROM, Blu-Ray disc, volatile or non-volatile media such as RAM (e.g. SDRAM, Double Data Rate (DDR), RAMBUS Dynamic Random Access Memory (RDRAM), SRAM, etc.), ROM, etc. As well as transmission media or signals such as electrical, electromagnetic, or digital signals, sent via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for a network-based service, comprising:
   receiving information from a user about the user's food preferences, wherein the information comprises at least one of food allergies, health conditions, or personal preferences;
   determining, from the received information, a plurality of ingredients, wherein each ingredient is either a preferred ingredient or an ingredient to be avoided for the user;
   receiving information indicating a restaurant of interest to the user;
   determining a plurality of menu items available at the restaurant of interest that are acceptable to the user based on the determined plurality of ingredients in the plurality of menu items;
   assigning, by a computer, a priority order to each of a plurality of categories that the plurality of menu items belong to, wherein the plurality of categories comprises menu items with ingredients to be avoided, menu items with preferred ingredients, and menu items with ingredients that are disliked;
   sorting, by the computer, the plurality of menu items in each of the plurality of categories, wherein the order of sorting is based on the assigned priority order of the category;
   ranking, by the computer, the plurality of menu items based on each menu item's sorted position in each category and the priority order of the categories; and
   presenting to the user the ranked menu items.

2. The method of claim 1, wherein determining the plurality of menu items that are acceptable comprises determining the menu items that do not have the indicated ingredients to avoid.

3. The method of claim 1, wherein determining the plurality of menu items that are acceptable comprises determining the menu items that have less than a specified amount of the indicated ingredients to avoid.

4. The method of claim 1, wherein the received information about the user's food preference includes a food allergy of the user.

5. The method of claim 1, wherein said received information comprises information from a user's health history and wherein the method further comprises determining the ingredients to avoid based on the information from the user's health history.

6. The method of claim 1, wherein said received information comprises information received from the user on ingredients to avoid.

7. The method of claim 1, wherein said determining the plurality of menu items comprises accessing a database of menu items and ingredients corresponding to the menu items to determine which menu items are acceptable based on the received information.

8. The method of claim 1, wherein presenting the ranked menu items to the user comprises providing the identifications of the ranked menu items to the user over a user's mobile device.

9. The method of claim 1, wherein receiving information indicating the restaurant of interest to the user comprises receiving a name and/or address of a restaurant from the user.

10. The method of claim 1, wherein receiving information indicating the restaurant of interest to the user comprises receiving global positioning system (GPS) coordinates from a user's mobile device and wherein the restaurant of interest is a restaurant located at the received coordinates or within a predetermined radius of the received coordinates.

11. A system, comprising:
   a processor;
   a memory coupled to the processor and configured to store program instructions executable by the processor to implement a network-based service for:
      receiving information from a user about the user's food preferences, wherein the information comprises at least one of food allergies, health conditions, or personal preferences;
      determining, from the received information, a plurality of ingredients, wherein each ingredient is either a preferred ingredient or an ingredient to be avoided for the user;
      receiving information indicating a restaurant of interest to the user;
      determining a plurality of menu items available at the restaurant of interest that are acceptable to the user based on the determined plurality of ingredients in the plurality of menu items;
      assigning, by a computer, a priority order to each of a plurality of categories that the plurality of menu items belong to, wherein the plurality of categories comprises menu items with ingredients to be avoided, menu items with preferred ingredients, and menu items with ingredients that are disliked;
      sorting, by the computer, the plurality of menu items in each of the plurality of categories, wherein the order of sorting is based on the assigned priority order of the category;
      ranking, by the computer, the plurality of menu items based on each menu item's sorted position in each category and the priority order of the categories; and
      presenting to the user the ranked menu items.

12. The system of claim 11, wherein determining the plurality of menu items that are acceptable comprises determining the menu items that do not have the indicated ingredients to avoid.

13. The system of claim 11, wherein determining the plurality of menu items that are acceptable comprises determining the menu items that have less than a specified amount of the indicated ingredients to avoid.

14. The system of claim 11, wherein the received information about the user's food preference includes a food allergy of the user.

15. The system of claim 11, wherein said received information comprises information from a user's health history and wherein the program instructions are further executable to determine the ingredients to avoid based on the information from the user's health history.

16. The system of claim 11, wherein said received information comprises information received from the user on ingredients to avoid.

17. The system of claim 11, wherein said determining the plurality of menu items comprises accessing a database of menu items and ingredients corresponding to the menu items to determine which menu items are acceptable based on the received information.

18. The system of claim 11, wherein presenting the ranked menu items to the user comprises providing the identifications of the ranked menu items to the user over a user's mobile device.

19. The system of claim 11, wherein receiving information indicating the restaurant of interest to the user comprises receiving a name and/or address of a restaurant from the user.

20. The system of claim 11, wherein receiving information indicating the restaurant of interest to the user comprises receiving global positioning system (GPS) coordinates from a user's mobile device and wherein the restaurant of interest is a restaurant located at the received coordinates or within a predetermined radius of the received coordinates.

21. A non-transitory computer-readable storage device storing program instructions, wherein the program instructions are computer-executable to implement a network-based service for:
  receiving information from a user about the user's food preferences, wherein the information comprises at least one of food allergies, health conditions, or personal preferences;
  determining, from the received information, a plurality of ingredients, wherein each ingredient is either a preferred ingredient or an ingredient to be avoided for the user;
  receiving information indicating a restaurant of interest to the user;
  determining a plurality of menu items available at the restaurant of interest that are acceptable to the user based on the determined plurality of ingredients in the plurality of menu items;
  assigning, by a computer, a priority order to a each of a plurality of categories that the plurality of menu items belong to, wherein the plurality of categories comprises menu items with ingredients to be avoided, menu items with preferred ingredients, and menu items with ingredients that are disliked;
  sorting, by the computer, the plurality of menu items in each of the plurality of categories, wherein the order of sorting is based on the assigned priority order of the category;
  ranking, by the computer, the plurality of menu items based on each menu item's sorted position in each category and the priority order of the categories; and
  presenting to the user the ranked menu items.

22. The computer-readable storage device of claim 21, wherein said received information comprises information from a user's health history and wherein the program instructions are further executable to determine the ingredients to avoid based on the information from the user's health history.

23. The computer-readable storage device of claim 21, wherein receiving information indicating the restaurant of interest to the user comprises receiving global positioning system (GPS) coordinates from a user's mobile device and wherein the restaurant of interest is a restaurant located at the received coordinates or within a predetermined radius of the received coordinates.

* * * * *